J. J. NOONAN.
INSECT TRAP.
APPLICATION FILED DEC. 10, 1914.
1,158,542.
Patented Nov. 2, 1915.
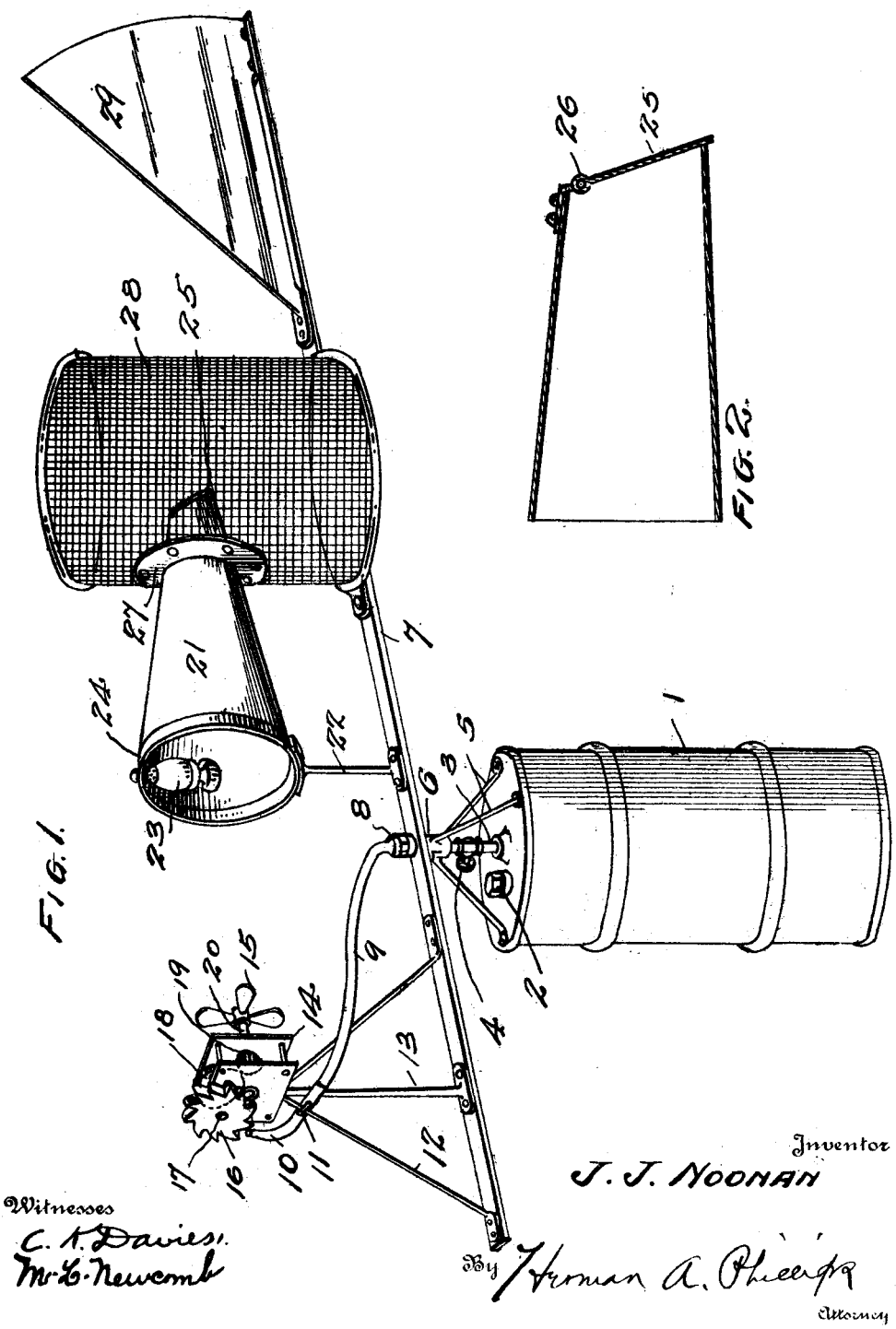
Witnesses
C. K. Davies.
Mr. L. Newcomb
Inventor
J. J. Noonan
By Herman A. Phillips
Attorney

UNITED STATES PATENT OFFICE.

JOHN JAMES NOONAN, OF OBION, TENNESSEE, ASSIGNOR OF ONE-HALF TO THOMAS O. MORRIS, OF UNION CITY, TENNESSEE.

INSECT-TRAP.

1,158,542.  Specification of Letters Patent.  Patented Nov. 2, 1915.

Application filed December 10, 1914. Serial No. 876,417.

*To all whom it may concern:*

Be it known that I, JOHN J. NOONAN, a citizen of the United States of America, residing at Obion, in the county of Obion and State of Tennessee, have invented certain new and useful Improvements in Insect-Traps, of which the following is a specification.

The present invention relates to improvements in insect traps, and is designed particularly for use on a farm, in an orchard, or in a garden, and other isolated places, where it is desired to destroy moths, insects, etc.

The primary object of the invention is the provision of a practical device adapted for use in isolated places where power such as steam or electricity are either inaccessible or otherwise unattainable, by means of which insects, moths, etc., may be attracted to the device and then trapped and destroyed, in order to rid the farm, orchard, or garden of the pest to which they are subjected by the insects.

The invention consists essentially in certain novel combinations and arrangements of parts by which a facile, economical and efficient device is produced for the purpose specified.

In the accompanying drawings I have illustrated one complete example of the physical embodiment of my invention constructed according to the best mode I have so far devised for the practical application of the principles of my invention, but it will of course be understood that minor changes and alterations may be made within the spirit of my claim without departing from my invention.

Figure 1 is a perspective view of a device constructed according to and embodying the novel features of my invention. Fig. 2 is a central vertical sectional view of a section of a funnel forming part of my invention.

In the preferred embodiment of my invention as illustrated in the drawings, the whole device is supported upon a heavy steel tank, as 1 adapted to be charged with compressed air, an inlet 2 being indicated in the upper head of the tank. Preferably the tank is cylindrical in form, and in addition to forming the compressed air reservoir, the tank provides a substantial and stable base for supporting the operating parts of the insect trap and destroyer.

Centrally located of the upper head of the tank is an outlet pipe 3 provided with a usual valve or cock 4, and projecting directly upward from the top of the tank. This pipe is braced by a series of radiating rods 5 which are secured to the top of the tank and converge at a sleeve 6 fitted about the pipe 3. This sleeve or bushing forms part of a bearing (which may well be a ball bearing) upon which a beam 7 is adapted to revolve, and the pipe 3 passes upwardly through this bearing sleeve and the beam.

Above the beam a coupling is made at 8, between the outlet pipe for the compressed air and a flexible pipe 9, which latter may be a rubber hose of acceptable type. At the free end of this hose a nozzle 10 is fixed, and the hose is supported by means of a loop 11 which is passed around a brace rod 12 secured to the beam 7 and an upright post 13.

The post 13 and brace rods 12 support the motor frame 14. The motor is designed to operate the fan 15, and is composed of a cupped wheel 16 on the shaft 17 supported in the frame, a large gear wheel 18 on the same shaft, and a smaller pinion 19 on the fan shaft 20. The cupped wheel 16, it will be noted is in operative proximity to the nozzle of the compressed air pipe to receive impulses of air therefrom, and be revolved thereby. In this manner the escaping air from the nozzle of the air pipe revolves the cupped wheel, the gear, the pinion and the fan, the parts being geared up so that the fan is revolved rapidly to create a draft of air therefrom.

The insect trap is supported on the beam at the other side of its center of rotation. This trap includes a metallic funnel 21 supported from the beam by a rod or post 22 and having in its large open end or mouth a lantern 23 suspended from the top portion of a metal band or ring 24. At one end of the funnel a swinging gate 25 is hinged as at 26, and this gate is preferably of light material as celluloid so that it may be swung back or upwardly by the force of the draft created by the fan to prevent exit of insects after they have been once trapped.

At 27 the conical funnel is attached to a screen receptacle 28, which preferbly has a closed top and bottom, and may be equipped with suitable doors.

At the extreme end of the beam, opposite the motor, a vane 29 is attached, to keep the device in operative position "in the wind."

From the above description taken in connection with my drawings, it is hardly necessary to describe the operation of my invention, as it seems obvious, but it may be that a short description will not be amiss. It will be understood that the motor end of the beam is held at all times to the wind by the vane and the beam which supports the devices is revoluble on the supporting tank. The motor, it will be readily understood, is operated by the discharge of compressed air from the tank and the fan is revolved to create a draft directed straight toward the lighted end of the conical funnel. The light attracts the insects and when they come within the currents of the air draft from the fan the insects are driven into the conical funnel. The gate of the funnel it will be remembered is sufficiently light so that it is swung back and held back by the air currents, and these air currents carry the insects through the conical funnel to the screen receiver or receptacle from whence they cannot escape. When the air currents stop from any cause, the gate swings back to place and exit from the receiver is closed. When it is desired to empty the receiver, it is detached from the beam and conical funnel, its door opened and the destroyed insects may be emptied out.

The portions of the sectional funnel 21, and preferably the outer section, has its inner wall coated with paint or enamel to provide a smooth surface so that there will be no lodging place for the insects within the funnel, and the surface of the funnel also provides a reflector for the light in the open mouth of the funnel.

The funnel at its smaller end projects well within the screen receptacle, to prevent the moth, or other insect climbing up the wall to entrance hole and escaping, and if desired, a door may be provided at the outer or larger end of the inner section of the funnel to be closed when the receptacle is detached for emptying the insects that have been trapped. In the event that the receptacle is turned down horizontally, it will be understood that its end will be of tin or other metal so that the funnel may be supported therein in manner similar to the use of the ring 27 for that purpose shown in Fig. 1.

What I claim is:—

The combination with a supporting base and a beam revoluble thereon carrying at one end a motor and fan, of an open end funnel facing the fan and supported diametrically opposite thereto, a light in the open end, a hinged freely swinging door closing the other end of the funnel, a screen receptacle inclosing the door end of the funnel, and a vane for holding the beam parallel with the direction of natural wind currents.

In testimony whereof I affix my signature in presence of two witnesses.

JOHN JAMES NOONAN.

Witnesses:
 THOMAS OVERTON MORRIS,
 ETHELDRED ALFONSO MORRIS.